(No Model.)

J. P. HUPPMANN.
OYSTER OPENER.

No. 411,381. Patented Sept. 17, 1889.

WITNESSES:
A. O. Babendrier.
John E. Morris.

INVENTOR:
J. P. Huppmann
BY Chas B. Mann
ATTORNEY.

UNITED STATES PATENT OFFICE.

JOHN PHILIP HUPPMANN, OF BALTIMORE, MARYLAND, ASSIGNOR OF ONE-HALF TO KILIAN AUGUST VOLK, OF SAME PLACE.

OYSTER-OPENER.

SPECIFICATION forming part of Letters Patent No. 411,381, dated September 17, 1889.

Application filed February 1, 1889. Serial No. 298,389. (No model.)

*To all whom it may concern:*

Be it known that I, JOHN PHILIP HUPPMANN, a citizen of the United States, residing at Baltimore, in the State of Maryland, have invented certain new and useful Improvements in Oyster-Openers, of which the following is a specification.

This invention relates to an implement for opening shell oysters, and is illustrated in the accompanying drawings, in which—

Figure 1:
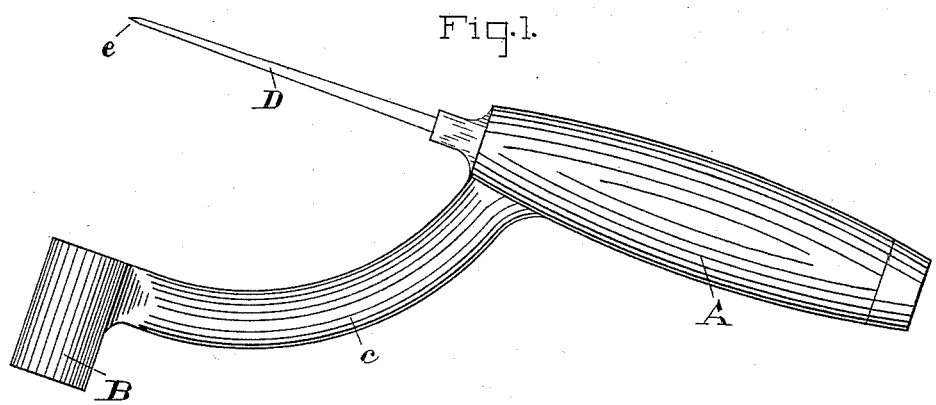
Figure 2:
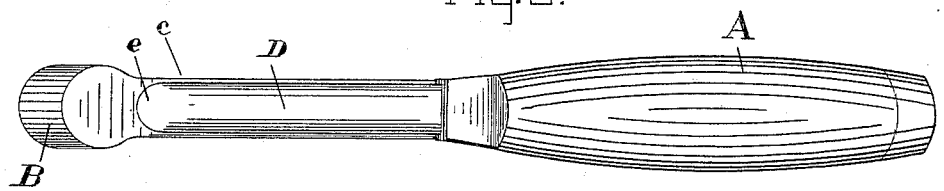

Figure 1 is a side view of the oyster-opener. Fig. 2 is a top view of same.

The implement comprises a handle A of any suitable shape or material, a hammer B, connected to the handle by a curved or laterally-projecting shank c, and an opening-blade D, flat at its extremity e and projecting from the end of the handle and in a direction corresponding to the longitudinal axis of the said handle. The distance of the hammer and the point end of the blade from the handle are approximately the same, whereby an effective blow can be struck with the hammer, and then with but little movement of the operator's hand the point end of the blade may be inserted in the shell where the latter was struck by the hammer.

In opening oysters with this implement a person will take the shell oyster in one hand and hold it against a suitable block or anvil, and with the other hand grasping the handle A of the implement will strike the edge of the oyster-shell with the hammer B, and thereby break off a portion of the shell. The flat end e of the blade may then be readily inserted between the two parts of the shell, which are then forced apart to expose the oyster on one part of the shell. The blade will serve also to assist in detaching the adhering oyster from the shell.

This implement with one handle thus serves to do the work that two implements are now commonly employed to do, and enables the person to accomplish more without any greater effort. This will be plain from the fact that where two implements are employed much time and effort are expended in so often dropping one and picking up the other, as must be done with each oyster.

Having described my invention, I claim—

The oyster-opening implement consisting of the handle A, having attached a straight opening-blade D, which projects forward in a direction longitudinal with respect to the handle, and said handle also having a hammer B, whose shank c curves laterally from the handle and then projects forward in the same direction as the opening-blade.

In testimony whereof I affix my signature in the presence of two witnesses.

JOHN PHILIP HUPPMANN.

Witnesses:
 JOHN E. MORRIS,
 JNO. T. MADDOX.